(12) United States Patent
Rehtanz et al.

(10) Patent No.: US 7,526,366 B2
(45) Date of Patent: Apr. 28, 2009

(54) ELECTRICAL POWER CONTROL SYSTEM, AND METHOD FOR SETTING ELECTRIC STATE VARIABLES AND/OR PARAMETERS IN A CURRENT CONDUCTOR

(75) Inventors: Christian Rehtanz, Baden-Dättwil (CH); Dirk Westermann, Zürich (CH)

(73) Assignee: ABB Research Ltd, Zurich (CH)

( * ) Notice: Subject to any disclaimer, the term of this patent is extended or adjusted under 35 U.S.C. 154(b) by 739 days.

(21) Appl. No.: 10/832,397

(22) Filed: Apr. 27, 2004

(65) Prior Publication Data

US 2004/0199298 A1 Oct. 7, 2004

Related U.S. Application Data

(63) Continuation of application No. 10/229,041, filed on Aug. 28, 2002, now abandoned.

(30) Foreign Application Priority Data

Aug. 28, 2001 (EP) .................... 01810836

(51) Int. Cl.
*H02M 1/00* (2007.01)
(52) U.S. Cl. .................... 700/293; 363/78; 713/340
(58) Field of Classification Search ............... 700/293, 700/40; 323/207, 234; 363/74, 78; 713/340; 227/143
See application file for complete search history.

(56) References Cited

U.S. PATENT DOCUMENTS 4,084,103 A * 4/1978 Burns et al. ............ 307/132 R
4,447,693 A * 5/1984 Buck ........................ 219/705
5,377,308 A * 12/1994 Inoue et al. .................. 700/40

(Continued)

FOREIGN PATENT DOCUMENTS

EP 0438059 A2 7/1991

(Continued)

OTHER PUBLICATIONS

V. Rajkumar et al., "Nonlinear Self-Tuning Control of a Flexible AC Transmission System", Proceedings of the Conference on Decision and Control, San Antonio, Dec. 15-17, 1993, New york, IEEE.

(Continued)

*Primary Examiner*—Albert W. Paladini
(74) *Attorney, Agent, or Firm*—Buchanan Ingersoll & Rooney PC (57) ABSTRACT

The invention is directed toward an electrical power control system (1) in an electrical power system, having: a power control unit (2) for setting electric state variables and/or parameters in a current conductor, to be controlled, of the electrical power system, having: means (3) for detecting electric characteristic values ($u_1$) of the current conductor; a function processor for applying a control function ($F_1(u_1)$) from a mathematical set of control functions to the electric characteristic values, and for determining controlled variables (y) for achieving the parameters; and coordination means for determining a control function ($F_1(u_1)$) from the set of control functions with the aid of operating states of the electrical power system. This system renders it possible to achieve a predictive tuned control of the electrical power control system which can also stabilize unusual operating states of the electrical power system.

28 Claims, 6 Drawing Sheets

U.S. PATENT DOCUMENTS 5,703,791 A     12/1997  Amano et al.
6,225,791 B1 *   5/2001  Fujii et al. .................. 323/207
6,380,875 B2 *   4/2002  Honkanen et al. ........... 341/144

FOREIGN PATENT DOCUMENTS

EP          0 707 370        4/1996

OTHER PUBLICATIONS

M.E. Aggoune et al., "Design of an Adaptive Variable-Structure Voltage Regulator Using Artificial Neural Network", Proceedings of the Conference on Control applications, Vancouver, Sep. 13-16, 1993, New York, IEEE.

European Search Report dated Jul. 19, 2002.

* cited by examiner

ELECTRICAL POWER CONTROL SYSTEM, AND METHOD FOR SETTING ELECTRIC STATE VARIABLES AND/OR PARAMETERS IN A CURRENT CONDUCTOR

This application is a continuation of U.S. application Ser. No. 10/229,041 filed in the U.S. Patent and Trademark Office on 28 Aug. 2002 now abandoned, which claims priority from European Patent Application No. 01810836.5 filed on 28 Aug. 2001. U.S. Application Ser. No. 10/229,041 and European Patent Application No. 01810826.5 are hereby incorporated by reference.

TECHNICAL FIELD

The present invention relates to an electrical power control system in an electrical power system with modifiable regulation or control functions and a corresponding method for setting the electric state variables and/or parameters in a current conductor which belongs to such an electrical power system.

PRIOR ART

Electrical power systems serve to provide and/or distribute electrical power to consumers. They comprise generators such as hydroelectric, coal-fired or nuclear power stations, storage batteries and the like (sources), a conductor and cable system, and consumers, that is to say electric consumers (loads). The wiring and cable system connects the generators to the consumers in the manner of a network. All permanently coupled elements participate in such an electrical power system. Owing to the close links between the various European power suppliers, it is possible to speak of a continental electrical power system with reference to Western Europe.

In principle, current is carried in the conductor system of an electrical power system in accordance with Ohm's law. So-called power electronics compensators have been developed in order to achieve a generally uniform capacity utilization despite non-optimized conductors, and so as to be able to ensure an economic, environmentally friendly and safe transmission of power. These units, also denoted as FACTS (flexible alternate current transmission system) devices, are capable of commutating power from one conductor to another, for example by means of current injection, phase-angle control, or power storage. They serve to ensure the quality and quantity of power.

It is possible for a power control unit to react robustly within certain limits to changes in the power supply situation, for example owing to increased or decreased consumption of a power consumer, in order to ensure the stability and the other goals, defined above, for the electrical power system. For this purpose, the power control unit measures various, electric characteristics of the current flowing through the current conductor to be controlled. The values thus determined are used by an algorithm to determine the measures to be taken by the power control unit. By means of suitable controlled variables, the power control unit keeps the state variables/parameters of the conductor to be controlled within prescribed ranges of values which define a stable control range in their totality.

If a power network with a plurality of power control units is disturbed, for example by a short circuit, it can happen that two such units that are installed there attempt to compensate this failure by means of countermeasures, the units possibly operating against one another such that an instability of the overall electrical power system can occur which can finally lead to damage to components. Since the power control units have reaction times in the millisecond range, while the central system control management possibly cannot notice the disturbance until after 10 or more minutes, and could then intervene manually, the prior art devices are virtually incapable in principle of preventing such problems.

In the case of relatively large distances between the power generators participating in the instability, such instabilities occur even more quickly, since the impedance between the generators is decisive for this. Since power control units can also enlarge the impedances and thus the apparent distance between generators increases due to the use of such devices, their use increases the risk of instabilities in the system.

Configuring a power control unit is a special design activity which must be carried out for each individual power control unit in a specific situation. All other control units of the electrical power system must be taken into account in designing a power control unit which is to be integrated.

If appropriate, all other power control units of the system must additionally be adapted to the new situation, which has resulted from the integration of a further power control unit, so that these can keep the control in a stable range of values.

The required adaptation is performed with the aid of computing methods by solving systems of differential equations which describe the behavior of the electrical power system. Since such complex systems of equations cannot sensibly be solved in one step, subsystems are initially calculated and combined as simplified equations to form metasystems of equations. This mode of procedure is very laborious and compute-bound, all the more so that an analysis must be carried out repeatedly for different load states of the electrical power system.

Controlled transmission paths are presently becoming increasingly necessary in order to provide the transmission logistics required to operate transmission systems competitively. However, the number of the controlled current conductors is presently limited, since the link control system of the overall system is incapable of coping with potential adverse interactions between the controlled conductors. This problem could possibly be eliminated by using control units for the overall network, but these would require a completely new high-speed network control system. Even then, however, an adverse interaction could not be reliably excluded.

There is therefore a need for power control systems which are capable of operating even in the case of disturbances in stable ranges, and which require no changes when enlarging or modifying the overall system. It is therefore the object of the invention to provide corresponding devices and methods which, owing to their "neutrality", can be operated without problems in the case of the most varied changes to the electrical power system.

SUMMARY OF THE INVENTION

The invention is based on the principle of allowing, with regard to novel transmission possibilities and more effective network utilization, a system enlargement which is as effective as possible and avoids a complete redesign of the overall system with reference to control.

In one aspect, the invention relates to the principle of predictive tuning, in which the various electrical power control systems in an electrical power system carry out a coordination with the electrical power. system.

In a further aspect, the invention relates to an approach for controlling power conductors in the case of which it is possible in all operating states to comply with stable ranges of electric characteristics which are at least not smaller than the stable range of normal operation.

In yet another aspect, the, invention relates to a control system for power conductors which can, within a very short time, react adequately and in a fashion maintaining stability to changes in operating state.

In a further aspect, the invention relates to a control system which can be used both for AC systems and for DC systems.

The invention is part of a series of measures which serve the purpose of the above-defined object, and which are combined under the term NISC™"nonintrusive system control architecture".

The invention is initially directed to an electrical power control system in an electrical power system, having:
a power control unit for setting electric state variables and/or variable parameters in a current conductor, to be controlled, of the electrical power system, having:
  means for detecting electric characteristic values of the current conductor;
  a function processor for applying a control function from a mathematical set of control functions to the electric characteristic values, and for determining controlled variables for achieving the state variables and/or parameters; and
coordination means for determining a control function from the set of control functions with the aid of operating states of the electrical power system.

Here, a power control unit is to be understood as a generically typical device for controlling a current conductor, as they are known in the prior art, for example FACTS devices, regulating transformers, simple switches, switched compensation elements and the like, it being possible, if appropriate, for the device according to the invention to have additional elements which enable it to execute the additional functions of the invention. Most of the elements used to control circuits can be combined with the invention. It is also possible to use the invention to control a completely controlled conductor, for example using DC technology.

A current conductor to be controlled is a link between two network nodes, such as a cable or an overhead line, for example for connecting generators or for the connection to consumers, in an electrical power system, in which the power control unit is installed and whose electric state variables/parameters are to be controlled. Electric state variables or parameters of the current conductor to be controlled are to be understood as those electric variables which can serve for describing the current flowing in the conductor, for example its voltage or current intensity, the phase angle (if an AC system is involved) and the impedance. The electric state variables may include, for example, the measured values, trigger signals, system state information, flags, and memory content. In this case, a state variable is a variable property of the power, while a parameter is to be understood as a physical property of the carrier.

The power control unit can measure various electric characteristics relevant when complying with the state variables/parameters, and can derive controlled variables from the measured values. The electric characteristics are generally tapped in this case directly at the current conductor to be controlled. It may be noted that the state variables and/or parameters of the current conductor and the electric characteristics can be identical or at least overlapping, since both can be determined on the same current conductor. Input variables are measured state variables/parameters. The input variables include, for example, voltage, current, frequency, angle, possible tripping signals and other available network information. A control algorithm is chosen based on the input variables.

The controlled variables are, in turn, numerical values which are relayed to an actuating element which is not part of the invention and is known from the prior art, and which thereupon appropriately adapts the state variables and/or parameters of the current conductor to be controlled. Output of the controller depends on the actuating device to be controlled. The output includes, for example, a series injected voltage, shunt injected current and tap position. The actuating device may be, for example, a network controller, like a controllable transformer, FACTS device or simply a circuit breaker.

The derivation of the controlled variables from the characteristic values is performed with the aid of a control function in a function processor which has at least the electric characteristics as parameters and which calculates them with the aid of prescribed algorithms such that the controlled variables emerge as the result. The term control function is to be widely understood in this case and comprises all possible assignment methods including the use of value tuple or value pair tables.

A function processor is to be understood in the sense of the present invention as any means, be it a data processing program or a special analog or switching logic unit which is capable of executing the control function or all the control functions from the set of control functions.

According to the invention, the control function to be applied is determined from a set of control functions by virtue of the fact that the coordination means undertakes a suitable detection of the current operating state and uses this state to determine the control function. The determination is performed in this case from a set of control functions, the term set requiring to be understood in the mathematical sense and comprising a countable number of various control functions, just as it does an infinite number resulting from the metacontrol function. The control functions can be, for example, several control algorithms for controlling the transmission path, for example active power flow control, reactive power flow control and voltage control. Typical control functions used in stand-alone controllers are P1 controllers with or without lead-lag combinations for damping control. More sophisticated control functions based on state variable control may also be used. The invention is not limited to specific local control functions and the key feature of the invention is the coordination between different local control functions.

The term determination is likewise to be interpreted widely. Thus, it can be performed in the modification of a prescribed control function by special terms dependent on the operating state, as it can, likewise, by the simple selection of one of several constant control functions.

All values and controlled variables used are preferably used as vectors conditioned by the system, in order to permit simple use in the functions and/or mappings. Account has been taken of this by using appropriate underlined variables. However, it goes without saying that it is also possible to use other types of value conditioning should these appear to be feasible, and/or represent the respectively current state of the art.

What is involved, therefore, is a process which has a total of three steps and can be executed with the aid of the electrical power control system according to the invention:

1. The operating state of the electrical power system is determined—somewhere—in the system. Said state is used in order
2. to determine a control function to be applied; and
3. the control function is applied to values of characteristics in order to generate controlled variables.

Various possibilities are available for implementing the coordination means, in particular. In a preferred embodiment, the coordination means has:

a coordination control unit, having
  means for detecting electric metacharacteristic values of the electrical power system which characterize the operating state of the electrical power system;
  a coordination processor for applying a mapping to the metacharacteristic values for the purpose of determining an item of selection information for a suitable control function;
  means for transmitting an item of selection information at a satisfactory rate via the suitable control function to the power control unit; and
a metafunction control processor in the power control unit for determining the suitable control function with the aid of the transmitted item of selection information.

The electric metacharacteristics should be selected such that they can give a sufficiently good overview of the respectively current operating state of the electrical power system. Which metacharacteristics are suitable also depends on the "intelligence" of the mapping which uses the metacharacteristic values to generate an item of selection information which is then used by the metacontrol function in order to determine the control function to be applied. The mapping is an important component in this preferred embodiment of the invention, since here an evaluation of the characteristics with regard to the putative operating state is undertaken, and the most suitable "behavior" of the power control unit is prescribed with the aid of this estimate.

The mentioned electric metacharacteristic contains information related to certain state variables in the power system, for example, voltages currents, frequencies, active power, reactive power and angle. The electric metacharacteristic also contains information regarding the electric values to be observed. The information depicts how the electric values are processed, what results out of this processing and what kind of action has to be performed in order to obtain the controlled variables.

The item of selection information is a datum or a collection of data, for example vectorial, in a suitable form in order to be used by the metacontrol function and to determine the actual control function to be applied.

The item of selection information is transmitted by means of a transmission means from the coordination control unit to the power control unit, where it is used.

According to the invention, in this case the transmission is to be performed at a satisfactory rate. This is to be understood to mean that the transmission is performed so quickly that the electrical power control system according to the invention can react sufficiently quickly in order to maintain the electrical power system in a stable state even in the case when operating states are changing.

The electrical power control system according to the invention can be characterized in that the metafunction control processor has means for applying a metacontrol function, which determines the suitable control function, and the item of selection information further contains electric metacharacteristic values, which are used when applying the metacontrol function in order also to determine the controlled variables. The metacontrol function changes the regular device control in order to adapt its behavior according to changing network conditions, particularly during contingencies and provides a supervisory control for the regular controller to prevent it from malfunctioning.

It is possible in this way also to make use of numerical data such as measured values directly for the purpose of determining the control function, specifically to modify it. It is therefore possible, for example, to make use of the same control function for different operating states, but respectively to adapt it, for example by (vectorial or scalar) multiplication by a factor which is included in the item of selection information and by which the result of the control function is multiplied, or otherwise used for calculation.

One factor in the successful use of the electrical power control systems according to the invention can be the rate at which the control function can be determined, the transmission of the item of selection information to the power control unit being ascribed an important role. Thus, it is possible to use a high-speed link between the coordination control unit and the power control unit, in order to ensure sufficiently fast transmission. It is likewise possible that the power control unit and the coordination control unit are combined in one device. It is possible in this case to dispense with a high-speed link, or the latter can be optimized within such a device.

Various possibilities are open for implementing the various components of the electrical power control system according to the invention. Thus, the processors can be designed as a plurality of hardware units or a single one, for example an analog computer. In an embodiment which is preferred because it is easy to implement and to integrate with the other components, the coordination processor, the metacontrol function processor and/or the function processor can be implemented as programs for a data processing system. The system can be implemented in a real-time operating system that interfaces with the process to be controlled, and has DSP calculation capability. Further, to enable a control system according to the NISC architecture, each local control system may have a data interconnection to the control center where a dedicated computer interfaces with the software in the central control room. The interface may be through SCADA and EMS software. This data interconnection may have a real time capability, such that it has response times of a few minutes. It may not be required to physically execute the interfacing process on a computer of the central control room.

Metacharacteristics detected by the coordination means are intended to give as good an overview as possible of the respective operating state of the electrical power system. The quality of the obtainable information depends, however, not only on the derivation of the operating states and the formulation, associated therewith, of an item of selection information. In particular, it is preferred that the metacharacteristics are at least partially identical to the characteristics. The determination of the operating state can be simplified and accelerated in this way, since use is made only of variables which can be derived locally. However, this embodiment places the highest demands on the evaluation of the metacharacteristics and therefore on the "intelligence" inherent to the mapping.

It is equally possible that the metacharacteristics are measured at least partially in other areas of the power distribution system than in the current conductor to be controlled. It is then desirable to transmit in a way as free from delay as possible for the purpose of quick identification of changes in the operating state.

The design of the regular (normal-state) control function is based on a thorough network analysis using conventional robust control unit design methods, for example the $H_-$ (H-infinite) control or the controlled Lyapunov functions (compare below). Should the control unit thus designed prove to be robust for all usual operating states, this network analysis need be carried out only once, and there is then no longer any need for further characterizations or structural changes.

However, if the operation is not robust, the efficiency of the electrical power control system should be checked at regular intervals, the controlled state variables/parameters requiring to be adapted correspondingly. For this purpose, the electrical power control system can preferably have an analyzing system for analyzing the characteristics and/or the metacharacteristics, and for checking and/or, if appropriate, changing the control functions, the mapping and/or the function of the metafunction control processor as a function of a result of the analysis.

In order further to improve the analytical capabilities of the analyzing system, it can also be desirable to provide it with additional information which renders possible a picture of the operating state of the electrical power system as a whole. It is sensible for this purpose to have recourse to existing power management systems which provide such information. The invention can therefore be characterized in that the analyzing system further has means for analyzing external characteristics, which can be, or are provided by a power management system of the overall electrical power system. In addition to general information on the electrical power system, such characteristics can also be desired variables for the system which all the electrical power control units should attempt to comply with, and which therefore must likewise be incorporated in the design of the control functions, the mapping and the metacontrol function.

As already mentioned, the term "determination" of a suitable control function is to be interpreted widely. It covers both modifications of an existing control function and selection from a set. Consequently, the term "set" of control functions is also variable. For example, the set of control functions can be a countable plurality of control functions which is determined by a metacontrol function. What is involved in this case is, for example, a set of control functions which are numbered, the metacontrol function constituting a simple list assignment which assigns one of the control functions to specific stipulations from the selection information.

The set of control functions can also constitute a continuum which is described by a metacontrol function. In this case, for example, the selection information features as a computing term in the metacontrol function which then, in accordance with its algorithm, generates a suitable control function from a base control function, or modulates or modifies the result by its application.

An important concept of the present invention is the setting of stable ranges of values for the electrical power system to be controlled. These stable ranges are defined initially for regular operation, but, given changes to the operating state, may not have new unstable ranges in which instabilities in the overall system can come about. It is therefore preferred that the control functions can regulate the controlled variables such that values of prescribed electric characteristics of the current conductor to be controlled can be kept within prescribed, stable ranges of values, a first control function for normal operation being able to comply with first stable ranges of values, and at least one second control function for a change in the operating state being able to comply with second stable ranges of values, which also cover the first stable ranges of values.

The changes to the operating state can both be a malfunction and a change in topology such as an operational extension (or contraction) of the overall network which belongs to the electrical power system. Individual control functions can preferably be given in each case for the various categories of malfunction. In the case of changes to the system, a range of control functions or an appropriately modified control function or a combination of the various possibilities is likewise provided.

The invention is likewise directed to a method which can be executed, for example, with the aid of the electrical power control system according to the invention. All that has been said with reference to the apparatus also holds for the method presented below, and vice versa, and so reciprocal reference is adopted and made.

The invention is therefore further directed to a method for setting electric state variables and/or variable parameters in a current conductor, to be controlled, of an electrical-power system, having the following steps:
- establishing electric metacharacteristic values;
- applying a mapping to the metacharacteristic values in order to generate an item of selection information with regard to a control function to be applied;
- applying the item of selection information to a metacontrol function which determines a control function to be applied from a mathematical set of control functions; and
- applying the established control function to electric characteristic values of the current conductor which fixes the controlled variables for controlling the current conductor.

It holds here, as well, that the values used are, for example, conditioned as a matrix or, preferably, as a vector, in order to facilitate application of the various mappings or functions.

A control function can be determined, for example, with the aid of the item of selection information, which is built into the control function as modulating terms. This is an application of the invention in which the set of the control functions constitutes a continuum whose elements are, as it were, fixed by the terms during application of the metacontrol function. Of course, other methods are also conceivable, in which a metacontrol function determines one of a continuum of control functions.

As already stated with regard to the electrical power control system according to the invention, the metacharacteristics can be at least partially identical to the characteristics, in order to simplify the measurement and to increase the rate at which the method is executed.

Alternatively, or in addition, the metacharacteristics can be measured at least partially in other areas of the electrical power system than in the current conductor to be controlled.

The method can further be designed in a special embodiment of the invention such that the mapping assigns specific ranges of values to metacharacteristics of specific items of selection information for control functions, and when the metacharacteristic values belong to a specific range provides the metacontrol function with the selection information belonging to this range. An actual selection is therefore made in this case from a countable set of control functions, a continuum of possible metacharacteristic measured values, for example vectors, being grouped such that in each case entire ranges of these values lead to the same control function.

Again, as already explained, the selection information can further include electric metacharacteristic values which are used in the application of the metacontrol function in order to determine the controlled variables. When substituted as terms into the metacontrol function, the values therefore cause immediate modulation of the control function and consequently influence the controlled variables.

It is also additionally possible in the method according to the invention to carry out an analysis in which the characteristic values and/or the metacharacteristic values are used to check and/or, if appropriate, to change the control functions, the mapping and/or the metacontrol function. The possibility of analyzing and changing the actual core logic in executing the method is an important option for improving the method behavior, since it is also possible in this way for unexpected variations in the operating state of the electrical power system to be adapted.

As already indicated, quick execution of the method is preferred in order to permit a rapid reaction to changes in the operating state of the electrical power system. Consequently, it is preferred, in particular, that a period required for carrying out the method from establishing electric metacharacteristics to applying the previously fixed control function to electric characteristics of the current conductor is shorter than a time interval which is provided for carrying out the analysis and for changing the control functions, the mapping and the metacontrol function.

This period can be at least one hundred times shorter, preferably at least one thousand times shorter than the time interval.

The time interval for carrying out the analysis will usually be approximately in the range from 5 to 15 minutes but can, however, also be in the range of hours in the case of complex analyses, while the method has to be able to react within seconds or even fractions of seconds in order to avoid instabilities in the electrical power system. Typical reaction times of control systems can be in the range of around 50, for example from 30 to 100 milliseconds, but there are also even faster control units.

Another approach to describing the present invention can reside in a controlling system which must satisfy specific requirements.

In order to be able to ensure correct functioning of an electrical power system, an electrical power control system must be capable of keeping the system in a stable range, the so-called coverage zone, with reference to the characteristics controlled by it. This purpose is served by the control function, which is designed such that under specific conditions it can comply with the stable range. However, as explained in the introductory part, conventional controllers frequently fail in the event of disturbances and changes to the topology of the electrical power system. The solution according to the invention consists in this view in rendering more than one stable range possible by means of various control functions, in which case the coverage zones, which are to be complied with in the event of changes by the other control functions, may not, in any case, be smaller than the coverage zone in "normal" operation, since otherwise there would arise after a change new unstable ranges in which the electrical power system cannot be operated although the control would permit these ranges on the controller.

The invention is therefore likewise directed to a controlling system in an electrical power control system for a current conductor to be controlled in an electrical power system, having:

a mathematical set of control functions which are capable of keeping electric state variables and/or variable parameters of the controlled current conductor within prescribed, stable ranges, there being provided for normal operation a base control function which can keep the electric state variables/parameters within first prescribed stable ranges, and the further control functions having larger stable ranges with reference to these electric state variables/parameters than the base control function.

This controlling system can preferably be characterized in that a metacontrol function can determine one of the control functions as the control function to be applied, as a function of electric metacharacteristic values measured in the electrical power system.

Furthermore, it can have a mapping (which corresponds to the above-defined mapping) for mapping the metacharacteristic values onto an item of selection information via the control function to be applied, it being possible to apply the item of selection information to the metacontrol function, in order to determine the control function to be applied.

The mapping can preferably generate an item of selection information which at the same time has electric metacharacteristic values, and the metacontrol function is designed in such a way that these metacharacteristic values can be or are used for modulating the control function, as was explained above with regard to the method.

Furthermore, the controlling system according to the invention can have an analyzing system which can analyze, and if necessary adapt, the control functions with regard to the stability to be achieved.

An important, preferred aspect of the present invention, which relates likewise both to the electrical power control system and to the method and the controlling system, is the analysis and formulation of control functions which satisfy the requirements placed on stable operation.

By developing control functions that are as robust as possible as early as in the planning phase, it is possible to avoid frequent downloading of control functions and metacontrol functions during operation.

Various approaches, which can also be combined with one another, are available for achieving such robustness.

One approach originates from the field of passivity theory. If a stable power system without a new, controllable device is assumed, the system is passive when a specific energy function reproduced below is satisfied.

It is therefore preferred that it holds for each control function from the set of control functions that the following energy function V(T) exists for all instants $T \geq 0$:

$$V(T) \leq V(0) + \int_0^T y(t)u(t)\,dt$$

$$\forall\, u(.),\, T \geq 0,$$

V(0) being the energy function at the instant 0, y being an electric output variable, and u being an electric input variable, and the electrical-power system is passive.

If an additional network controller satisfies the same conditions and is likewise passive, the two systems are likewise passive and therefore stable in the case of parallel connection or in a feedback loop. This means that the additional components do not affect the stability itself if there is no power flow from the system. This suffices for normal operation with fixed operating conditions, but this approach is silent on the attenuation response of the resulting system.

The other, very similar approach is the controlled Lyapunov function for a system with the structure $$\dot{x} = f(x, u) = f_0(x) + \sum_{i=1}^{m} u_i f_i(x)$$

If the electrical power system is stable without control input, it can be shown that there is a positive energy function $V_{PS}(x)$, where $$\dot{V}_{PS} \leq 0.$$

The system with the electrical power control system is stable if in the event of combination of $V_{PS}$ with the energy function of the controllable element $V_{CO}$ the resulting function is a Lyapunov function for the new system.

This holds when the preferred embodiment is applied in accordance with which it holds for each control function from the set of the control functions that the following condition is fulfilled for the electrical power system:

$$\dot{V}=\dot{V}_{PS}+\dot{V}_{CO}\leq \dot{V}_{CO}\leq 0,$$

V being the resulting energy function, $V_{PS}$ being the energy function of the system before the addition of a new control unit, and $V_{CO}$ being the energy function of the control unit. By using the above approaches, a redesign of the electrical power control systems can be avoided, and stable operation with other control systems can be achieved.

BRIEF DESCRIPTION OF THE DRAWINGS

The aim below is to explain the invention in more concrete and further-reaching terms, reference being made to the attached drawings, in which the following is illustrated.

WAYS OF IMPLEMENTING THE INVENTION

With reference to novel ways of transmission or distribution, it is obligatory to provide a system response which does not impair the rest of the system (except, if appropriate, for the purpose of providing specific control functions as auxiliary services). This is achieved by means of a system control architecture which permits the control of transmission paths (current conductors or cables), virtually without the rest of the system being impaired. This system is therefore introduced as "non-intrusive system control architecture (NISC)".

It is based on the idea of firstly defining the desired functions for a controllable transmission system which can be mapped onto a prescribed control device design in order to implement these functions. The controller defined in functional terms in such a way results in controllable components which are power-electronic or hybrid or conventional components, and which must be added to the system. These components fulfill only the desired functions. It is decisive for the invention in this case that the control design be implemented in a way such that the remainder of the system is not negatively impaired, and all other system components remain unaffected.

Various measures have been implemented in the scope of the NISC approach, of which one is the electrical power control system according to the invention with the associated method.

As a result, the transmitting and receiving ends of a conductor seem to have a settable generator unit and a load with a self-adjusting control response, which can then be designated as non-intrusive with reference to the dynamics of the remainder of the system. A certain robustness can be achieved by applying the NISC approach, and this ensures a coordinated control of the transmitting and receiving ends of a controlled transmission path even under load peaks and in the event of faults.

The aim of the NISC architecture is to simplify the design process such that novel transmission paths can be designed without having to conduct extensive system studies. The required control properties should neither negatively influence the overall system, nor require a redesign of control units already implemented. In addition, the architecture according to the invention permits a control reaction to critical events and avoids inadequate, and therefore incorrect, operation after changes in operating state.

The result overall for the NISC architecture is the following specifications:

the design of novel control units requires no redesign of existing network control units;
various network control units, operate in a coordinated fashion with the same control approach;
the control units are robust with regard to the requirements placed on the operation of the electrical power system (that is to say diurnal and seasonal fluctuations in operating conditions);
the design of the control units for system control and for auxiliary services is modular and can be scaled for different control ranges;
there is no need for long-distance communication links, which can therefore be avoided depending on design; and
no malfunction occurs in overload situations.

The aim below is to explain the functioning of the invention by way of example with reference to a concrete embodiment.

Figure 1:
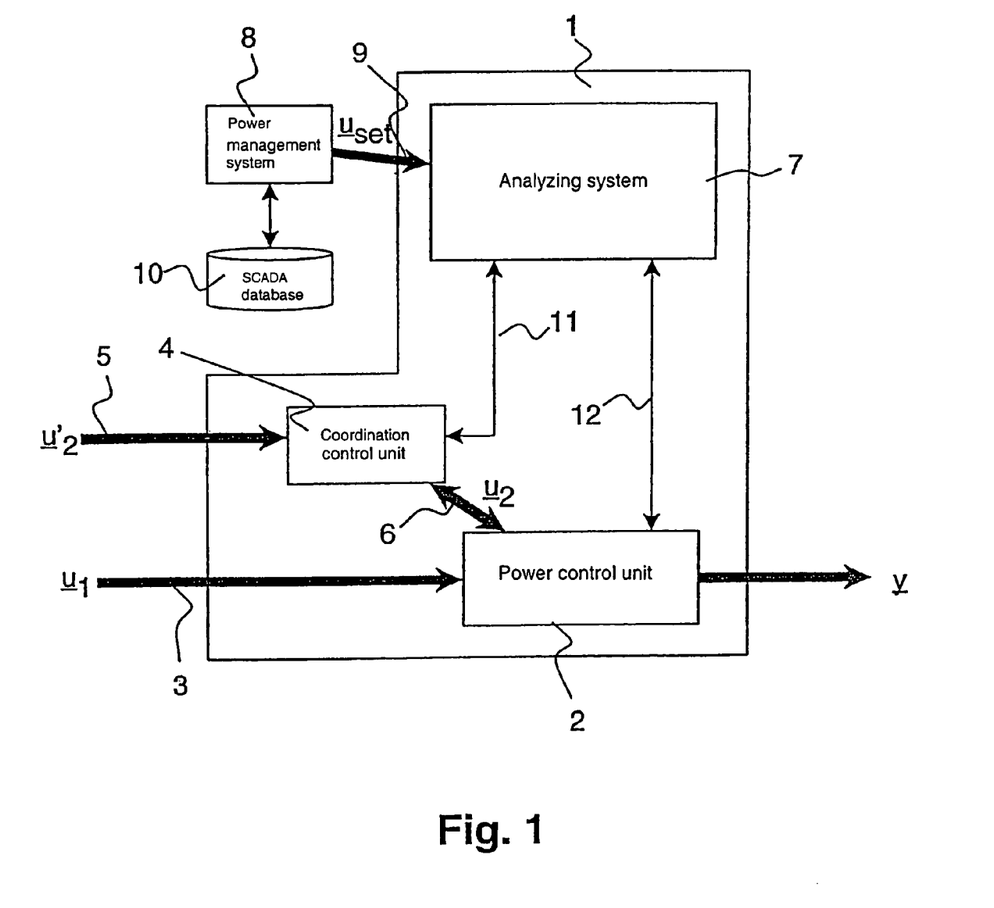
FIG. 1 shows an electrical power control system according to a preferred embodiment of the present invention, with a connected analyzing system.

FIG. 1 shows a schematic of the various components of this exemplary embodiment. The electrical power control system 1 firstly has a power control unit 2 which receives incoming measured values $\underline{u}_1$ of various electric characteristics via an input channel 3. As made plain by the underscoring, the characteristic values $\underline{u}_1$ can be present in this case as a vector, and this simplifies the calculation. The power control unit now calculates the controlled variables $\underline{y}$ by applying the control function to these values:

$$\underline{y}=F_1(\underline{u}_1).$$

In this case, however, the determination of the control function $F_1$ to be applied is added as a novel component according to the invention. This can also be performed in the power control unit 2. The purpose of determining the control function can be served, for example, by a metacontrol function $F_2$ into which an item of selection information $\underline{u}_2$ is introduced such that it follows overall for the calculation of the control function that:

$$y=F_2(F_1(\underline{u}_1),\underline{u}_2)$$

$\underline{u}_2$ can also be a vector in this case.

If, for example, a "normal" control function is assumed for closed-loop control, it is possible to assume a "neutrality" of the, metacontrol function for this closed-loop control, that is to say that the metacontrol function has no influence in the normal state, and so it holds that:

$$F_2(F_1(\underline{u}_1),\underline{u}_2) \cong F_1(\underline{u}_1).$$

The item of selection information is generated in the coordination unit 4 by applying a mapping G to measured values of metacharacteristics $\underline{u}'_2$. The mapping G can be described in general as:

$$G: \underline{u}'_2 \to \underline{u}_2.$$

The metacharacteristic values $\underline{u}'_2$ are fed via a measuring channel 5 to the coordination unit 4, where, by applying G, they are further processed by a suitable processor, for example an appropriately programmed microcontroller. The coordination undertaken there is time-variant and depends on the actual network characteristics and the topology. Consequently, despite functional parallels, the electrical power control system according to the invention is not to be regarded as belonging to the class of adaptive controllers. The principal difference resides in the mapping G, which defines which type of characteristics are imaged onto which item of selection information. In particular, by comparison with centralized real-time network controllers, the required set of high-speed data transmission is drastically reduced, since there is no need for an additional broadband or SCADA system.

The item of selection information $\underline{u}_2$ is transmitted, for example, to the power control unit via a high-speed channel 6. This channel 6 must be able, in any case, to operate so quickly that the electrical power control system 1 can react quickly enough to changes in the measured values $\underline{u}'_2$ in order to avoid instabilities in the electrical power system. It is likewise possible to implement the two units 2 and 4 in terms of one device so that the channel 6 then-would constitute only a parameter transfer in a program, that is to say would be implemented inside a CPU.

By implementing the metacontrol function and providing selection information, the electrical power control system can be adapted to new situations substantially better than is known in the prior art. Important for successful determination of a suitable control function is firstly, the detection of suitable metacharacteristics, and secondly their mapping onto an item of selection information. However, in the case of detection of a suitably large number of metacharacteristics, this criterion is no longer critical, since it is then assumed that the required selection information can be generated by skillful mapping.

In order to obtain permanent control of whether the applied mapping, the metacontrol function and/or the actual control functions as well can still fulfill their function in the given framework of the overall electrical power system, it is possible, furthermore, to provide an analyzing system 7 which is connected by connecting channels 11 and 12 to the power control unit 2 and the coordination unit 4 and receives information which it subjects to an analysis. The analyzing system 7 investigates the functions or mappings used for their current ability to maintain the stability in the electrical power system. No changes are undertaken if this analysis shows that the currently used functions can maintain the stability. If the result of the analysis is that instabilities can occur in the case of specific operating states, the analyzing system suitably adapts the set of the control functions, the metacontrol function or the mapping. In addition to the internally measured characteristics, it is also possible to use for the analysis data $\underline{u}_{set}$, also including, if appropriate, desired variables for the electrical power system, of a central power management system 8 which is connected via a channel 9 to the electrical power control system 1, specifically to the analyzing system 7, and which can supply a global overview of the system status. Use may also be made for this purpose of the SCADA database 10, which likewise contains information on the current state and time profile of the electrical power system. It is possible in this case to dispense with a direct link between the SCADA system and the various control units according to the invention.

Figure 2:
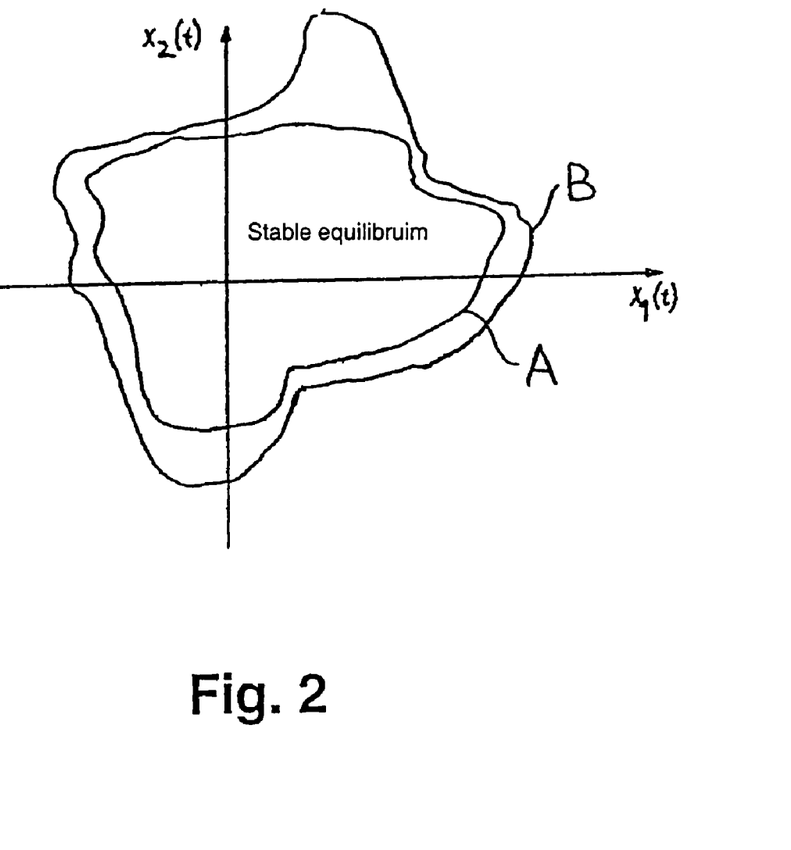
FIG. 2 shows, by way of example, stable ranges of an electrical power system before and after a change to the system.

The aim of FIG. 2 is to explain how the term stable ranges is to be understood. FIG. 2 illustrates two system state variables $X_1$ and $X_2$ as a function of time on the X-axis and Y-axis, respectively. Here, a range A denotes the range of values of the two state variables within which the system is stable in the normal operating state, the so-called coverage zone, and how it can be complied with by a control function. In the event of a change in the system, the control function is modified by the metacontrol function, or exchanged for another control function which has other stable ranges, denoted by B. It is, a characteristic of the present invention in this case that the new stable range overall is at least not smaller than the old one, that is to say no regions occur where originally stable operation was possible before the change, but unstable states are present after the change. The original stable range is therefore a subset of the new stable range of operating points, and the new coverage zone is larger than the old one.

It was possible in the prior art for such unstable ranges to reoccur in the event of changes and they required a redesign of the power control units affected.

Typical disturbance events which require a coordination of control measures for network controllers are, for example:
    short circuits in transmission elements;
    overloading of electrical devices;
    failures of electrical devices;
    quick changes in the power flow, for example ones associated with disturbances in power stations.

Figure 3:
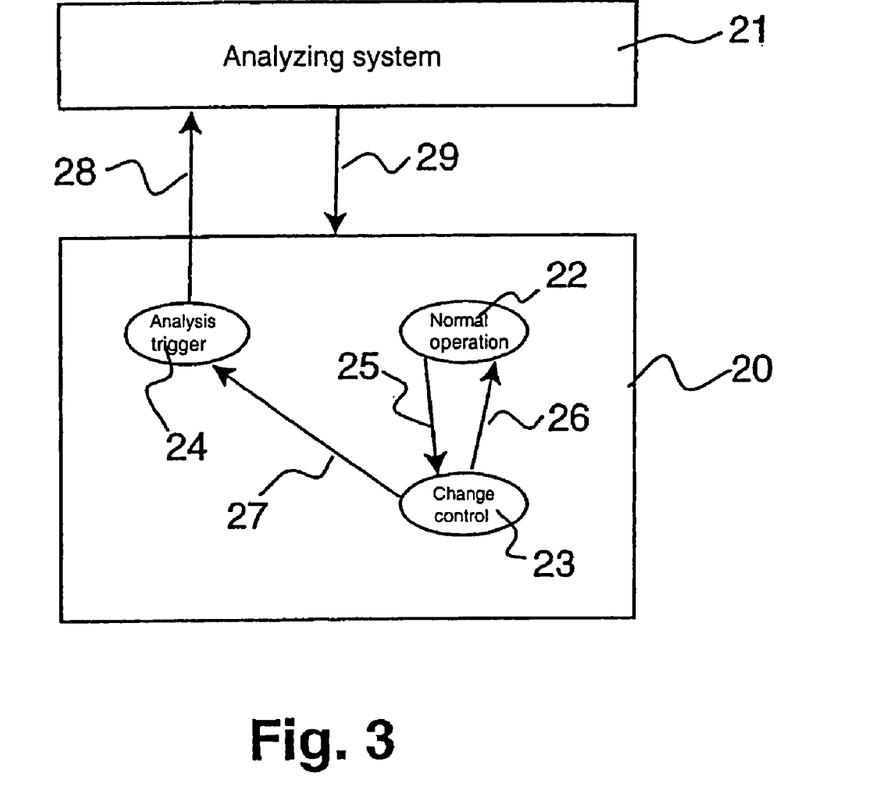
FIG. 3 shows a schematic of the functional relationships between the various components of the invention.

It is necessary to detect the abnormal situation in the electrical power system in order to be able to carry out these coordinated control tasks. One possibility for implementation in this case is a heuristic analytical event reaction system such as is illustrated in FIG. 3 as a state diagram. The box 20 in this case represents the range of an electrical power control system 1 according to the invention, which exerts the actual control, while the box 21 represents the analyzing system. There is a bubble 22, which symbolizes the normal operation of the device, inside the unit 20. If a critical event 25 occurs, a transition is made to the bubble 23, the change control. After processing of, the critical state, the change control decides whether to return to the normal state via route 26 if no topological change has taken place, or whether, in the event of the presence of a topological change 27, to trigger an analysis trigger 24 which, via path 28, activates the analyzing system 21, where a topological analysis and a setup of the heuristic analytical event controller are undertaken. The result of this analysis is downloaded in the form of modified (to the extent necessary) control functions, metacontrol function or mapping G into the range 20, use being made of the download path 29. The latter corresponds physically to the paths 11 and 12 shown in FIG. 1.

The aim below is to explain by way of example the mode of operation of the supplementary analyzing system according to the invention. Knowledge of the operation of controllable devices in critical situations can be formulated in generic rules. For example, rules of this type are as follows for the case of a fast power flow controller (PFC) as an example for a power control unit:

1. IF "short circuit on the PFC path" OR "short circuit on a parallel path" THEN "slow down setpoint control of the PFC".

This coordinative measure prevents excessive power oscillations after a short circuit followed by automatic reclosing. The reason for this is that the power flows fluctuate violently during the short circuit. Because of the short response time of such PFCS, these respond immediately and attempt to reset the setpoints. Consequently, the manipulated variables of the PFC are strongly increased within a short period and reach their maximum value even before the fault is cleared and the reclosing has started. After clearing the disturbance and the fault, the increased values of the variables can lead to oscillations. A possible countermeasure is to slow down the setpoint control. Moreover, a PFC can commutate the power flow on parallel paths such that apparent power flows on the parallel paths can be influenced by changes in the setpoints for active or reactive power flows on the controlled path. Thus, it is possible by means of this measure to avoid device overloading on parallel paths owing to changes in setpoint.

2. IF "device overload on parallel path of the PFC" THEN "modify the P setpoint of the PFC".

As a first step for the automatic transformation of these generic rules into concrete control actions it is necessary to analyze the network topology automatically. The result is a mapping of all the parallel paths onto the PFC path. This information is used in order to create a rule base for the power control unit according to the invention on the device control level for each unit according to the invention in an electrical power system. The rule base is part of the information downloaded from the analyzing system.

Specific rule bases which represent coordinating measures for malfunctions are a function of topology. They can only handle the "next" event in each case. Once an equilibrium situation has been reached after a disturbance, the rule bases must be adapted, if necessary, in accordance with the new situation. The rule bases must also be appropriately updated for regular changes in the electrical power system.

The aim below is to explain in more detail the time sequence of the analysis and the reaction of the electrical power control system according to the invention. The analysis carried out in the optional analyzing system can be executed in prescribed intervals in order to adapt the electrical power control system to new conditions. A typical adaptation cycle ($\Delta T_{CR}$) comprises an operating condition analysis with a planning phase and a downloading phase. The planning phase serves to fix new event reaction schemes and structural control parameters, and determine new setpoint conditions for, for example, active or reactive power flow control or voltage control.

"Downloading" is the synonym for refreshing the decentralized information on the status of the electrical power system in the power control unit and/or the coordination unit. This permits a coordinated control activity of the electrical power control systems according to the invention even during malfunctions.

Figure 4:
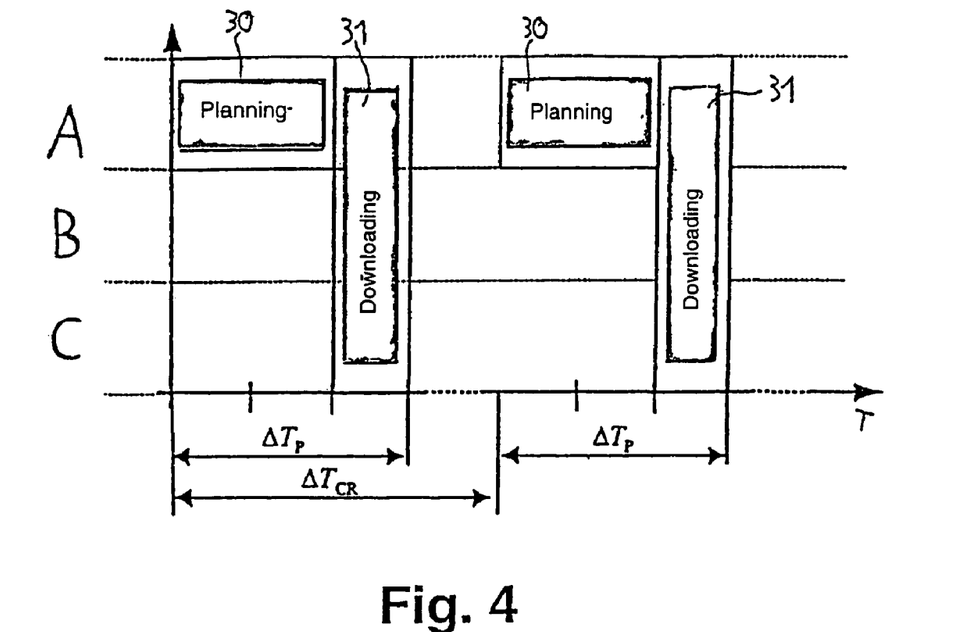
FIG. 4 shows the time sequence of the method according to the invention, including an analyzing step.

FIG. 4 shows the time profile of this adaptation cycle. Time is depicted on the X-axis, while the various components which are active are illustrated on the Y-axis. A corresponds in this case to the analyzing system, B to the coordination means and C to the power control unit.

During a time phase $\Delta T_P$, the planning 30 takes place in A, and the downloading 31 is undertaken in all subranges A–C. The remainder of the adaptation cycle $\Delta T_{CR}$ is operated by the electrical power control system in a normal operating mode, as it is characterized, for example, by the method according to the invention. In terms of time, a typical adaptation cycle can be in the range from 5 to 15 minutes, although shorter or longer periods are also possible, for example, minutes, quarters of an hour, or days, depending on the purpose of use and requirements.

A critical factor in the application of the electrical power control system according to the invention is the dynamic response of the electrical power system.

Figure 5:
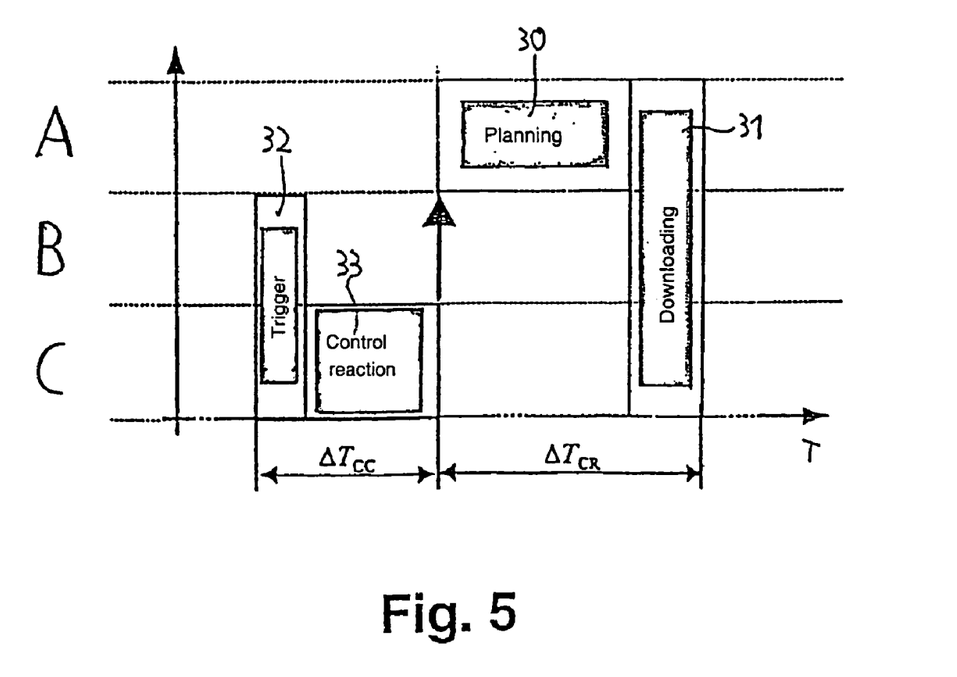
FIG. 5 shows the time profile of the method according to the invention in the case of a changed operating state.

The coordination must be carried out in accordance with the changing operating conditions or critical events in the electrical power system. The invention solves this problem by means of the approach of predictive tuning. This control mechanism is activated by trigger signals which characterize a malfunction in the system and which are converted by the method according to the invention in accordance with a locally implemented control method within the electrical power control system according to the invention. As FIG. 5 shows, a cycle of time $\Delta T_{cc}$ is used, which is started, for example, via a trigger 32 mediated by means of the characteristic u'2, and fed to a control reaction unit 33. The analysis of the cycle time $\Delta T_{CC}$ and of the normal adaptation cycle $\Delta T_{CR}$ explains in this case, in addition, that an online coordination of the various electrical power control systems cannot be achieved in an electrical power system, since it should be the case that $$\Delta T_{CC} << \Delta T_{CR}$$

Consequently, the concept according to the invention is designated as predictive tuning, since the required analysis is carried out before an execution cycle $\Delta T_{CC}$ begins.

Figure 8:
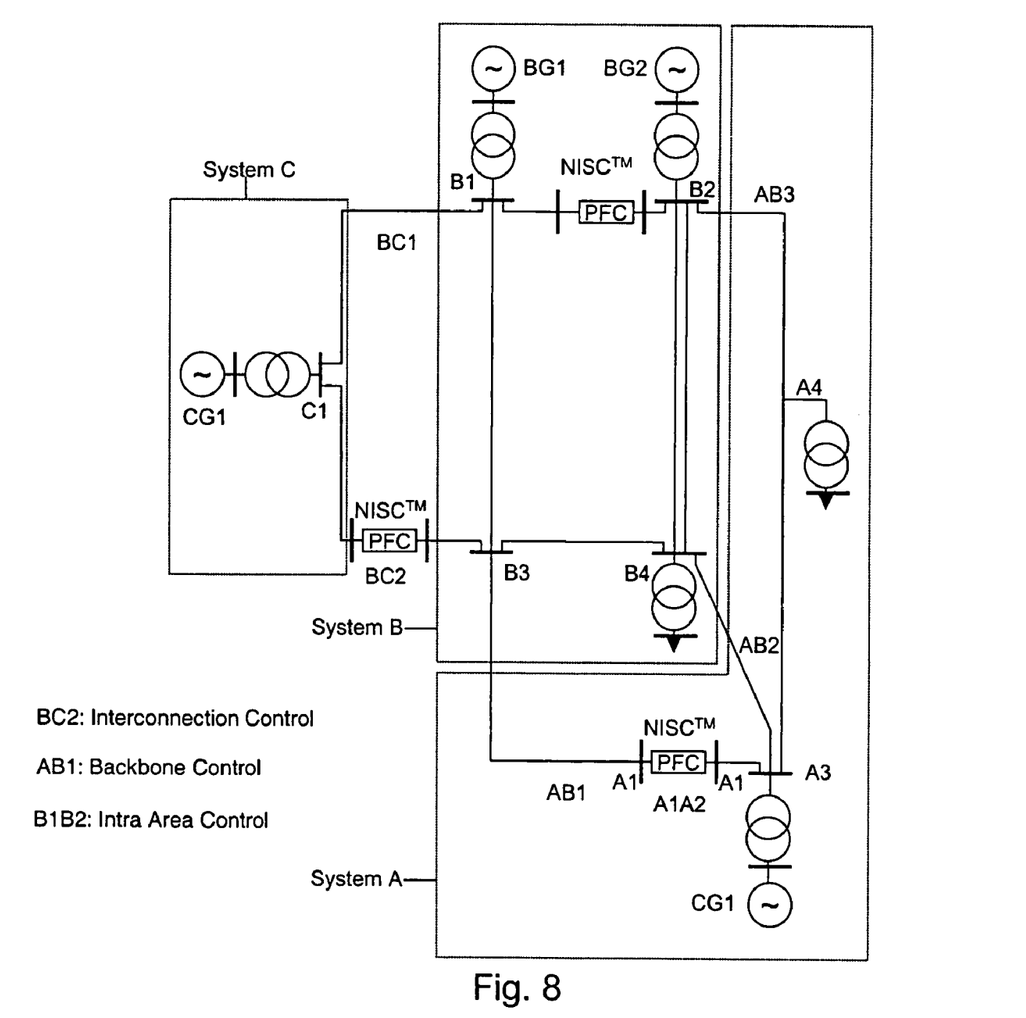
FIG. 8 shows, by way of example, a typical network situation.

Two simulation examples are intended below to explain the invention with regard to the efficiency of the coordinating measures. A typical network situation is shown in FIG. 8, in which three different systems A, B and C are interconnected. System C is connected to system B by a PFC in line BC2, the PFC being used for controlling the inter-connections. System A serves as backbone for system B, which are interconnected via lines AB1, AB2 and AB3. System A uses a PFC in line AB1 in order to compensate the exchanged power. Within the system B, a further PFC between the two generators in the range of system B serves the purpose of controlling the inner range in order to avoid disturbances. The PFCs are in this case those in accordance with the invention.

Based on this fictional electrical power system, rule bases and global information for the PFCs used are generated for the numerical simulations with the aid of the methods described. The following scenarios are used by a simulation environment in MATLAB/SIMULINK, in order to show the properties of the predictive tuning within a system.

1. Three-phase short circuit in the connecting line AB2 in the vicinity of the generator A3 at the instant t=0.1 for 100 ms with reclosing after 220 ms.

Figure 6:
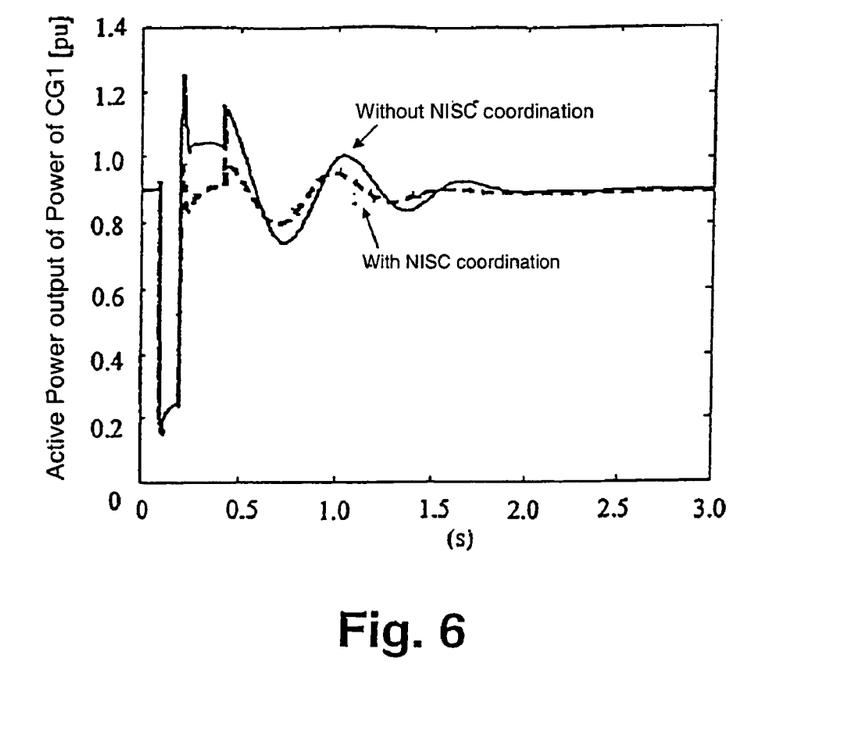
FIG. 6 shows, by way of example, the response of the electrical power control system according to the invention in the case of a three-phase error.

Line AB2 was identified by a topological analysis as a part of the parallel path of the two PFCs between A and B and within B. The modules for the generic rule 1 react directly to the short circuit and slow down the setpoint tuning of their corresponding power control units by selecting a suitable control function. The effect is to be seen from FIG. 6, in which the time profile is illustrated on the X-axis, and the active power output of the generator in the range A is illustrated on the Y-axis. As may be seen, the two PFCs cause only a small rise in the variables during the short circuit and the following reclosing. The damping is better with the use of mechanisms according to the invention (dashed line) than is known from the prior art (continuous line).

2. Power overloading owing to a rapid rise in the load at the node B3 (part of the range B).

Figure 7:
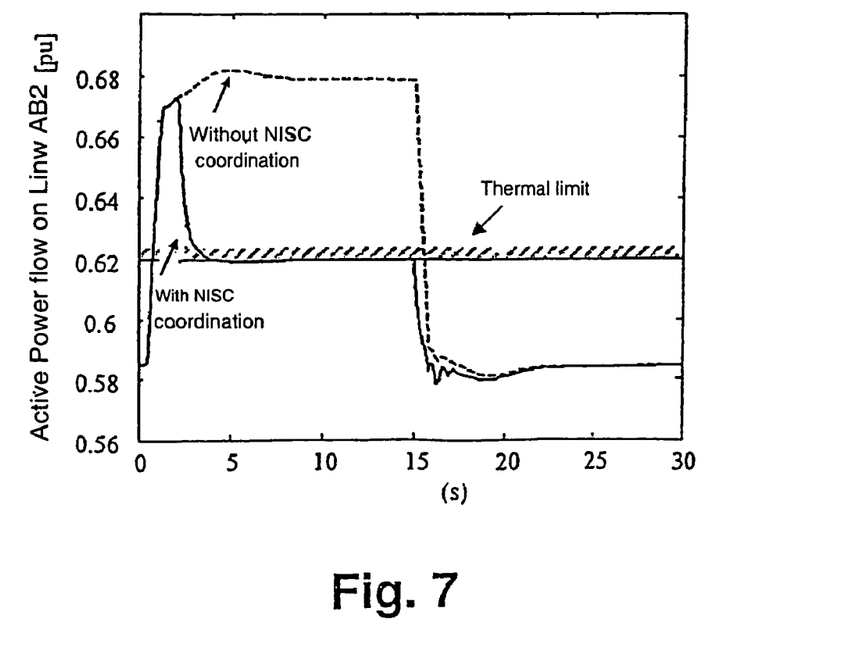
FIG. 7 shows, by way of example, the response of the electrical power control system according to the invention in the case of a growth in load.

In the case of a stepwise increase in the power, the load frequency controllers of the electrical power control systems operate so as to cover the additional power requirement. The three adopted PFCs in this case receive the power flow on the controlled paths. Consequently, they cannot be used to transmit the excess power. The capacity of the line AB2 which connects, inter alia, the ranges A and B, is utilized to approximately 94% before the power rises. In the case of a sudden power rise of 0.24 pu at the instant t=1 s, the power frequency control contribution of the generator must be transmitted via line AB2. Without the method according to the invention (dashed line in FIG. 7, which shows the active power flow of the line AB2 on the Y-axis), a certain overload results (the line running at 0.62 pu in FIG. 7 characterizes the thermal limit). Since the line is detected according to the invention as an element of a parallel path to the monitored path AB1, the PFC thereof counteracts the overload by increasing the setpoint for the active power flow. This results in a power flow commutation, as a result of which AB2 is relieved. At t=15 s, the power is once again set to the original value (FIG. 7, continuous line). The control system resets itself automatically when no further coordinating control activities are required.

LIST OF REFERENCE SYMBOLS

1 Electrical power control system
2 Power control unit
3 Input channel
4 Coordination control unit
5 Measuring channel
6 High-speed channel
7 Analyzing system
8 Power management system
9 Data channel
10 SCADA database
11 Connecting channel
12 Connecting channel
20 Actual control range
21 Analyzing system
22 Normal operation
23 Change control
24 Analysis trigger
25 Critical event
26 Return to the normal state
27 Variation of the topology
28 Activation path
29 Download path
30 Planning
31 Downloading
32 Trigger
33 Control reaction
$F_1(\underline{u}_1)$ Control function
$F_2(F_1(\underline{u}_1), \underline{u}_2)$ Metacontrol function
G Mapping
$\underline{u}_1$ Characteristic values
$\underline{u}'_2$ Metacharacteristic values
$\underline{u}_2$ Selection information
$\underline{u}_{set}$ External characteristic values
y Controlled variables

The invention claimed is:

1. An electrical power control system in an electrical power system, comprising:
    a power control unit for determining controlled variables (y), controlled variables (y) being electric state variables and/or variable parameters in a current conductor, of the electrical power system, to be controlled, the power control unit including:
    means for detecting electric characteristic values ($\underline{u}_1$) of the current conductor;
    a function processor for applying a control function ($F_1(\underline{u}_1)$), from a mathematical set of control functions, to the detected electric characteristic values, and for determining controlled variables (y); and
    coordination means for determining the control function ($F_1(\underline{u}_1)$), to be applied, from the set of control functions, the determination of the control function ($F_1(\underline{u}_1)$) being based on operating states of the electrical power system, the operating states of the electrical power system being determined based on overall system parameters and detected electric characteristic values ($\underline{u}_1$).

2. The electrical power control system as claimed in claim 1, wherein:
    the coordination means includes
    a coordination control unit (4), including
    means for detecting electric metacharacteristic values ($\underline{u}'_2$) of the electrical power system, the metacharacteristics of the electric power system being electric characteristics that provide an overview or characterize the operating state of the electrical power system;
    a coordination processor for applying a mapping (G) to detected electric metacharacteristic values ($\underline{u}'_2$) in order to obtain an item of selection information ($\underline{u}_2$)
    means for transmitting the item of selection information ($\underline{u}_2$) at a satisfactory rate to the power control unit; and
    the power control unit (2) including:
    a metafunction control processor for determining the a suitable control function ($F_1(\underline{u}_1)$) based on the transmitted item of selection information ($\underline{u}_2$) the suitable control function ($F_1(\underline{u}_1)$) is a control function that can be then applied to the detected electric characteristics in order to determine the controlled variables.

3. The electrical power control system as claimed in claim 2, wherein:
    the metafunction control processor has means for applying a metacontrol function ($F_2(F_1(\underline{u}_1), \underline{u}_2)$) to determine the suitable control function ($F_1(\underline{u}_1)$); and
    the item of selection information ($\underline{u}_2$) further contains electric metacharacteristic values, wherein the contained electric metacharacteristic values are used when applying the metacontrol function ($F_2(F_1(\underline{u}_1), \underline{u}_2)$) in order to determine the controlled variables.

4. The electrical power control system as claimed in claim 2, wherein the means for transmitting the item of selection information ($\underline{u}_2$) at a satisfactory rate comprises a high-speed link between the coordination control unit and the power control unit.

5. The electrical power control system as claimed in claim 2, wherein the power control unit and the coordination control unit are combined in one device.

6. The electrical power control system as claimed in claim 1, wherein the coordination processor, the metacontrol function processor and/or the function processor are implemented as programs for a data processing system.

7. The electrical power control system as claimed in claim 2, wherein the electric metacharacteristics are at least partially identical to the detected electric characteristics.

8. The electrical power control system as claimed in claim 2, wherein the electric metacharacteristics are measured at least partially in other areas of the electrical power system than in the current conductor to be controlled.

9. The electrical power control system as claimed in claim 1, comprising an analyzing system for analyzing the detected electric characteristics and/or the electric metacharacteristics, and for checking and/or, if appropriate, changing the control functions ($F_1(\underline{u}_1)$), the mapping (G) and/or the metacontrol function based on the analysis.

10. The electrical power control system as claimed in claim 9, wherein the analyzing system comprises means for analyzing external characteristic values ($\underline{u}_{set}$) which can be, or are provided by a power management system of the overall electrical power system.

11. The electrical power control system as claimed in claim 2, wherein the mathematical set of control functions ($F_1(\underline{u}_1)$) is a countable plurality of control functions ($F_1(\underline{u}_1)$), and the control functions are determined by the metacontrol function ($F_2(F_1(\underline{u}_1), \underline{u}_2)$).

12. The electrical power control system as claimed in claim 2, wherein the mathematical set of control functions constitutes a continuum which is described by a metacontrol function ($F_2(F_1(\underline{u}_1), \underline{u}_2)$).

13. The electrical power control system as claimed in claim 1 wherein:
the control functions ($F_1(\underline{u}_1)$) can regulate the controlled variables (y), the controlled variables are controlled such that values of prescribed electric characteristics of the current conductor are controlled and kept within prescribed, stable ranges of values; and
the mathematical set control functions comprises a base control function ($F_1(\underline{u}_1)$) for normal operation, the base function being able to comply with first stable ranges of values, and at least one second control function ($F_1(\underline{u}_1)$) for a change in the operating state, the second control function being able to comply with second stable ranges of values, the second stable ranges of values covering the first stable ranges of values.

14. A method for determining controlled variables (y), the controlled variables (y) being electric state variables and/or parameters to be controlled in a current conductor of an electrical power system, having the following steps:
detecting electric metacharacteristic values ($\underline{u}'_2$), metacharacteristics being electric characteristics that characterize and provide an overview of the operating states of the electric power system;
acquiring an item of selection information ($\underline{u}_2$) by applying a mapping (G) to the detected electric metacharacteristic values ($\underline{u}'_2$);
determining a control function ($F_1(\underline{u}_1)$) from a mathematical set of control functions by applying the item of selection information ($\underline{u}_2$) to a metacontrol function ($F_2(F_1(\underline{u}_1), \underline{u}_2)$); and
determining controlled variables (y) by applying the determined control function ($F_1(\underline{u}_1)$) to electric characteristic values ($\underline{u}_1$) of the current conductor.

15. The method as claimed in claim 14, wherein determining the control function ($F_1(\underline{u}_1)$) from a mathematical set of control functions comprises modifying the control function ($F_1(\underline{u}_1)$) by applying to the control function ($F_1(\underline{u}_1)$) the acquired item of selection information ($\underline{u}_2$) as modulating terms.

16. The method as claimed in claim 14, wherein the electric metacharacteristics ($\underline{u}'_2$) are at least partially identical to the electric characteristics ($\underline{u}_1$) of the current conductor.

17. The method as claimed in claim 14, wherein the electric metacharacteristics ($\underline{u}'_2$) are measured at least partially in areas of the electrical power system other than in the current conductor to be controlled.

18. The method as claimed in claim 14, comprising:
assigning specific ranges of values to the electric metacharacteristics ($\underline{u}'_2$); and
providing the metacontrol function ($F_2(F_1(\underline{u}_1), \underline{u}_2)$) with the item of selection information ($\underline{u}_2$) corresponding to the entire range of values of the electric metacharacteristic values ($\underline{u}_2$) by applying the mapping (G).

19. The method as claimed in claim 14, wherein the selection information ($\underline{u}_2$) further includes electric metacharacteristic values which are used in the application of the metacontrol function ($F_2(F_1(\underline{u}_1), \underline{u}_2)$) in order to determine the controlled variables (y).

20. The method as claimed in claim 14, wherein an analysis is additionally carried out in which the electric characteristic values and/or the electric metacharacteristic values ($\underline{u}'_2$) are used to check and/or, if appropriate, to modify the control functions ($F_1(u_1)$), the mapping (G) and/or the metacontrol function ($F_2(F_1(\underline{u}_1), \underline{u}_2)$).

21. The method as claimed in claim 20, wherein a period ($\Delta T_{cc}$) required for carrying out the method from establishing electric metacharacteristics ($\underline{u}'_2$) to applying the determined control function ($F_1(\underline{u}_1)$) to electric characteristics of the current conductor is shorter than a time interval ($\Delta T_{cr}$) which is provided for carrying out the analysis and for changing the control functions ($F_1(\underline{u}_1)$), the mapping (G) and the metacontrol function ($F_2(F_1)\underline{u}_1) \underline{u}_2)$).

22. The method as claimed in claim 21, wherein the period ($\Delta T_{cc}$) is at least one hundred times shorter than the time interval ($\Delta T_{cr}$).

23. The method as claimed in claim 22, wherein the period ($\Delta T_{cc}$) is at least one thousand times shorter than the time interval ($\Delta T_{cr}$).

24. A controlling system in an electrical power control system for a current conductor to be controlled in an electrical power system, comprising:
a function processor configured to apply a control function ($F_1(\underline{u}_1)$) from a mathematical set of control functions ($F_1(\underline{u}_1)$) to establish prescribed stable ranges for electric state variables and/or parameters of the controlled current conductor,
wherein the mathematical set of control functions includes for normal operation a base control function ($F_1(\underline{u}_1)$) that establishes first prescribed stable ranges for the electric state variables and/or parameters of the controlled conductor, and further control functions ($F_1(\underline{u}_1)$) having prescribed stable ranges for the electric state variables and/or parameters of the controlled conductor that exceed the first prescribed stable ranges determined by the base control function ($F_1(\underline{u}_1)$).

25. The controlling system as claimed in claim 24 wherein:
the function processor is configured to apply a metacontrol function ($F_2(F_1(\underline{u}_1), \underline{u}_2)$) to determine from the mathematical set of control functions ($F_1(\underline{u}_1)$) the control function ($F_1(\underline{u}_1)$) to be applied, based on electric metacharacteristic values ($\underline{u}'_2$) measured in the electrical power system, and
the electric metacharacteristics describe electric characteristics that are at least partially measured in areas of the electric power system other than in the current conductor and characterize the operating states of the electric power system.

26. The controlling system as claimed in claim 25, comprising:
a coordination processor configured to apply a mapping (G) that maps the metacharacteristic values ($\underline{u}'_2$) onto an item of selection information ($\underline{u}_2$),
wherein the function processor is configured to apply the item of selection information ($\underline{u}_2$) to the metacontrol function ($F_2(F_1(\underline{u}_1), \underline{u}_2)$) to determine the control function ($F_1(\underline{u}_1)$) to be applied.

27. The controlling system as claimed in claim 26, wherein:
- application of the mapping (G) generates the item of selection information ($\underline{u}_2$) such that the item of selection information comprises the electric metacharacteristic values; and
- the function processor is configured to apply the metacontrol function ($F_2(F_1(\underline{u}_1), \underline{u}_2)$) to modify the determined control function ($F_1(\underline{u}_1)$) to be applied by using the metacharacteristic values comprised in the item of selection information.

28. The controlling system as claimed in claim 24, comprising an analyzing system configured to analyze and if necessary adapt the control functions ($F_1(\underline{u}_1)$), the metacontrol function ($F_2(F_1(\underline{u}_1), \underline{u}_2)$) and/or the mapping (G) in accordance with a desired stability of the electrical power system.

* * * * *